United States Patent [19]
Mingus et al.

[11] 3,866,638
[45] Feb. 18, 1975

[54] NON-LATCHING, DRY-BREAK FLUID COUPLING

[75] Inventors: Ray E. Mingus, Mission Viejo; Ross M. Stuart, Santa Ana, both of Calif.

[73] Assignee: Kaiser Aerospace and Electronics Corporation, Irvine, Calif.

[22] Filed: July 9, 1973

[21] Appl. No.: 377,337

[52] U.S. Cl............... 141/352, 137/614.03, 277/30, 285/165, 285/231
[51] Int. Cl.............................................. B65b 3/07
[58] Field of Search .......................... 141/346–362; 285/164, 165, 231; 277/30; 251/149.7; 137/614.03, 344; 244/135; 141/291–302

[56] References Cited
UNITED STATES PATENTS

| | | | |
|---|---|---|---|
| 2,442,622 | 6/1948 | Starr ..................................... | 277/30 |
| 2,470,989 | 5/1949 | Keller et al. ........................ | 285/165 |
| 2,620,208 | 12/1952 | Patch et al........................... | 277/30 |
| 2,781,205 | 2/1957 | Lane et al........................... | 285/165 |
| 3,023,030 | 2/1962 | Torres................................. | 251/149.7 |
| 3,352,332 | 11/1967 | Swatek et al. ..................... | 141/349 |
| 3,380,476 | 4/1968 | Torres............................... | 251/149.7 |
| 3,799,223 | 3/1974 | Feneziani............................ | 285/165 |

*Primary Examiner*—Houston S. Bell, Jr.
*Attorney, Agent, or Firm*—Fulwider Patton Rieber Lee & Utecht

[57] ABSTRACT

A non-latching, dry-break, fluid coupling suitable, for example, for the refueling of racing automobiles. A housing connected with a fluid receiver has an open ended passage in which a valve seat is positioned. A plunger is resiliently biased against the downstream side of the valve seat to close it. A hollow probe connected with a supply of the fluid is insertable through the open end of the passage. A sleeve valve mounted on the probe is movable between open and closed positions to control flow of fluid through the probe, and is resiliently biased to its closed position. The probe, as it enters the passage in the housing, unseats the plunger to open the valve seat for flow into the receiver. In addition, the sleeve valve is brought in contact with the upstream side of the valve seat. Further inward mmovement causes relative motion between the probe and the sleeve valve to the open position of the latter so that fluid flows through the probe and the valve seat into the receiver. On uncoupling, both valves reseat when the probe is moved outwardly, to prevent fluid spillage.

6 Claims, 5 Drawing Figures

NON-LATCHING, DRY-BREAK FLUID COUPLING

BACKGROUND OF THE INVENTION

This invention relates to a releasable, dry-break fluid coupling which is suitable, for example, for use in refueling racing automobiles and in other applications where spillage must be prevented. The term "dry-break" indicates a coupling where the coupling parts separate from each other without spillage of fluid.

In automobile racing, it is important to refuel very rapidly during pit stops and refueling is often performed using either dump cans or overhead fueling rigs. A dump can is a hand-held container of 8–12 gallon capacity having a funnel-like spout which is inverted and placed against the inlet of the automobile fuel tank. An overhead rig includes a flexible hose with an outlet pipe which is coupled manually to the inlet to the fuel tank. Using either of these systems, there is a problem of spillage of fuel which can occur when the spout of the dump can (or the outlet pipe of the overhead rig) is applied to the tank inlet and when it is subsequently removed. The problem is particularly aggravated during removal, both due to the difficulty of telling when the tank is full and because time pressure on the pit crew is most intense at the end of the pit stop. As a result, it is not uncommon for quantities of fuel to be spilled over the vehicle and pit area, and from time to time serious fires and damage to automobiles and personnel have occurred.

In recognition of this problem, prior equipment has been developed for coupling the fuel supply, usually in an overhead rig environment, to the vehicle fuel tank utilizing male and female coupling elements connected with the tank and the rig, having resiliently biased check valves in the coupling elements to avoid spillage during coupling and uncoupling operations. Such prior systems have usually incorporated latching elements, sometimes requiring a relative rotation between the coupling elements to latch and unlatch them, in order to prevent fuel pressures during fueling from forcing the coupling elements apart.

Although such prior systems have been used in major commercial automobile racing events, problems have been encountered under the stress of racing conditions when one of the coupling elements has been forced onto the other in a condition of imperfect axial alignment, thereby creating a condition of binding engagement between them which hinders subsequent release of the coupling elements. On the occasions when this has occurred, serious loss of time during the pit stop can occur in freeing the coupling elements. In addition the need to latch and unlatch the coupling elements at the start and conclusion of fueling causes other delays in a situation where time saving is critical.

Another known prior coupling, not used in automobile racing, includes a female element having an open ended passage and an annular valve seat in the passage, which is provided with upstream and downstream, conoidal surfaces facing towards and away from the open end respectively. Closure of the passage is effected by a valve plunger, having conoidal side surfaces and a flat radial face, resiliently biased against the downstream surface of the valve seat. A male coupling element includes a probe which may be inserted through the upper end of the passage, and a rigid, slidable sleeve having oppositely inclined conoidal, inner and outer valve surfaces at its leading end. Each of the valve surfaces of the sleeve is grooved along its periphery to receive a compressible sealing ring. An inward movement of the probe into the passage brings the outer valve surface of the sleeve into seating relation against the upstream surface of the valve seat and also bring a flat radial surface at the leading end of the probe into abutting contact with the radial race of the valve plunger. Further inward motion of the probe unseats the valve plunger for flow through the valve seat and also unseats an inner conoidal surface of the leading end of the probe from the inner valve surface of the sleeve, thereby enabling fluid to flow from the space between the sleeve and the probe through the valve seat.

Such prior device, although satisfactory for its intended purpose, would not be acceptable for use in an environment, such as refueling automobiles, where the male and female coupling elements are often forced together with considerable violence while angularly misaligned. Attempted coupling of misaligned conoidal mating surfaces would result in an interrupted line of peripheral contact between the surfaces leaving gaps through which fuel could escape.

A further problem of the prior device would arise due to the flat face to flat face abutting contact of the radial faces of the probe and the plunger. If there should be an angular misalignment as the probe is forced into the passage, the resulting composite outline of the plunger and the leading end of the probe, which should approximate an inverted tear drop, streamline shape, would be interrupted by a marked discontinuity. Such a discontinuity could result in a destruction of the laminar quality of liquid flow past the plunger and thereby significantly reduce the rate at which fuel can be fed into the tank.

SUMMARY OF THE INVENTION

A non-latching, dry-break coupling according to the invention minimizes the possibility of fuel spillage during refueling of a vehicle fuel tank. A housing is connected with the vehicle fuel tank and includes an outwardly facing, open ended passage in which a valve seat is mounted. The valve seat is normally closed by a resiliently biased plunger bearing against its downstream side. A hollow probe connected with the fuel supply is movable through the open end of the passage and unseats the plunger from the valve seat to open it for flow into the tank. A sleeve valve mounted on the probe is biased to a closed position in which it prevents fuel flow through the probe. At the time the probe is inserted into the passage, the sleeve valve is brought into seating relation against an upstream side of the valve seat. Further inward movement of the probe causes relative movement between the probe and the sleeve valve to an open position in which the sleeve valve permits fuel to flow through the probe and the valve seat into the tank.

The plunger together with the nose of the probe by which it is engaged have a composite outline, or external surface shape, of generally streamline form so that flow past them remains in a laminar condition. In a significant aspect of the invention, the engaging end surfaces of the plunger and the nose are of a mating spherical configuration so that they can turn in such relation that their approximately streamline, composite external profile is maintained, even through there is some angular misalignment between the probe and the plunger. Thus the flow remains laminar even when the probe is inserted in a misaligned condition.

In a further significant aspect of the invention the sleeve valve, at its lower end, comprises a solid collar of resilient, elastomeric material. The resilient nature of the collar enables it to deform sufficiently to maintain continuous peripheral sealing engagement with the upstream side of the valve seat on those occasions when the probe is forced into the housing in an angularly or transversely, misaligned condition. Because the collar is deformable, however, it does not bind against the housing wall or present any severe resistance to withdrawal when the probe is withdrawn at the conclusion of fueling.

With the arrangement described, it will be appreciated that a flow path to the fuel tank is opened before the fuel can flow through the probe from the supply. Thus, the possibility of delivering fuel before the tank is ready to receive it is avoided so that spilling during coupling is prevented. When it is time to uncouple, the sleeve valve remains in contact with the valve seat during an initial upward stage of movement of the probe in which the relative movement of the sleeve valve in relation to the probe terminates fuel delivery. At the conclusion of this initial stage, the probe is still holding the plunger away from the valve seat which is open. This arrangement avoids the possibility that fuel will continue feeding after the tank has become closed. As a result the possibility of spillage during uncoupling is also minimized.

Another advantage of the invention is that the housing and the plunger, which seats on the valve seat, provide a safety closure for the fuel tank if the automobile should be involved in an accident while racing and become inverted. As a result, the fire hazard involved in an inversion of the automobile is reduced.

Although the invention will be described hereinafter with particular reference to refueling of an automobile fuel tank, the releasable coupling is of potential application wherever it is desired to connect a supply of fluid with a fluid receiver, for example, in filling containers with beverages, filling tanker vehicles with sewage or, in filling drums with gaseous or liquid chemicals. Thus, the invention is not to be considered in any way limited to the automobile racing field although it has been particularly effective herein.

These and further advantages of the invention are described in the accompanying detailed description.

BRIEF DESCRIPTION OF THE DRAWINGS

A non-latching, dry-break coupling according to the invention is illustrated in the accompanying drawings in which.

DETAILED DESCRIPTION

A releasable coupling according to the preferred embodiment of the invention may be used for refueling a racing automobile 6 (FIG. 1) by a pit mechanic utilizing a conventional dump can 8. The dump can 8 is a cylindrical drum having a funnel-like spout 10 which is turned during the fueling operation to face towards the vehicle fuel tank. The can 8 is vented by a convoluted, vertical hollow tubing handle 12 connected to and communicating with the opposite end of the dump can. Alternatively, the releasable coupling may be used with an overhead rig which includes a flexible hose connected to an external supply of the fuel with an outlet tube provided on the hose. Dump cans and the use of an overhead rig are well known.

Figure 2:
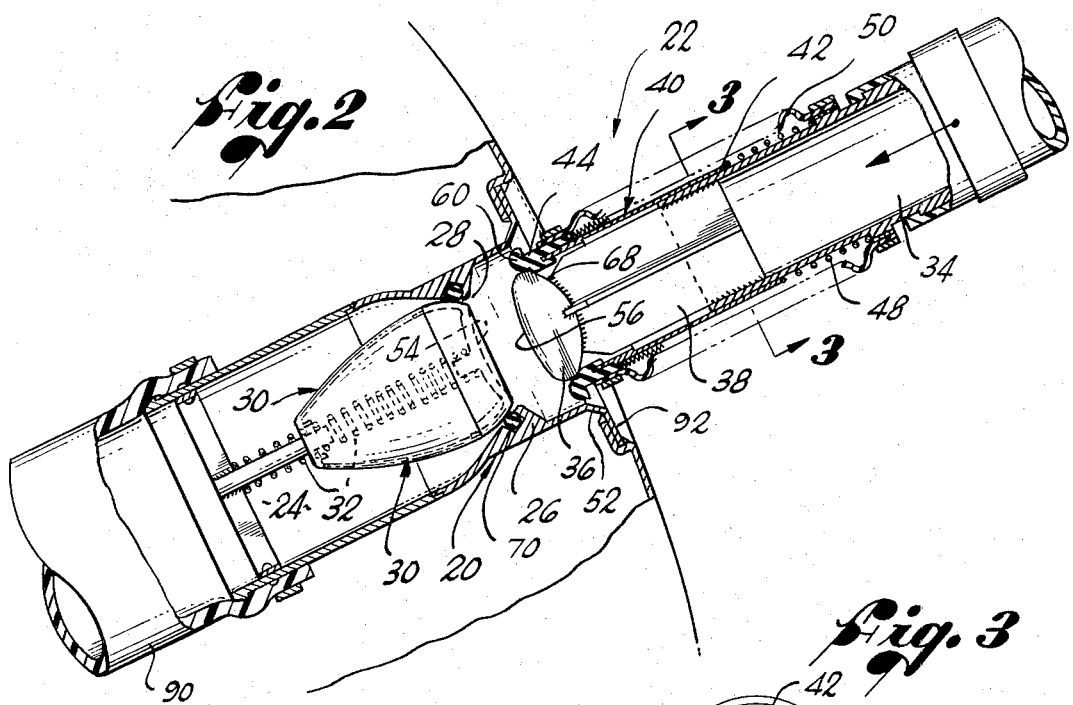
FIG. 2 is a cross-sectional, side view of the preferred embodiment of the releasable coupling showing an initial stage of engagement of the coupling parts prior to passage of fuel from the supply into the tank.

The releasable coupling of the invention comprises a housing 20 secured to the vehicle and a probe 22 secured to the outlet spout of the dump can (or to the outlet tube on the hose of an overhead fueling rig). The housing 20 (FIG. 2) is a generally cylindrical metal shell having a passage 24 through it which communicates with the interior of the tank and is open at its outer end. A constricted valve seat 26 within the passage is spaced from the open end. An opening 28 through the valve seat 26 is closed by a valve plunger 30 which is resiliently biased against the lower, or downstream, side of the valve seat by a compression spring 32. The spring 32 at its upper end is fixed to a short pin projecting concentrically from the interior of the plunger and at its lower end is connected to another upstanding pin extending along the axis of the housing and carried by struts extending radially to the housing. The spring 32 thus functions as a support for the plunger 30, which enables the plunger to deviate sufficiently from axial alignment with the housing (FIG. 4) so that it can position itself in relation to the nose of the probe as described hereafter.

The probe 22 includes a hollow, tubular upper body 34 and a solid nose member 36, constituting the free end of the probe, which is spaced below and concentrically aligned with the upper body 34 and connected to it by an axial support 38. Mounted on the probe is a sleeve valve 40 for controlling the flow of fuel through the probe. The sleeve valve includes a tubular, lower body 42 telescopingly mounted about the exterior of the upper body 34, and an annular collar 44 (FIG. 3) fixedly secured to the lower end of the lower tubular body 42. The collar 44 is urged downwardly so that its radially inner peripheral surfaces seat against the upper surface of the nose member 36 in sealing relation therewith, by a compression spring 48 (FIG. 2) mounted between the upper and lower bodies 34 and 42.

To provide a liquid-tight enclosure about the exterior of the probe preventing escape of fuel from between the telescoping upper and lower bodies, a deformable cover or seal 50 is provided. The cover 50, which is of generally bellows-like configuration, has its lower end sealingly secured to the collar 44 and has its upper end sealingly secured to the exterior of the upper tubular body 34 of the probe spaced above the highest location reached by the upper end of the lower tube 42 out of contact therewith. The cover 50 is formed from a liquid impervious, flexible elastomer impregnated on a fabric like base material such as fiber glass.

Figure 1:
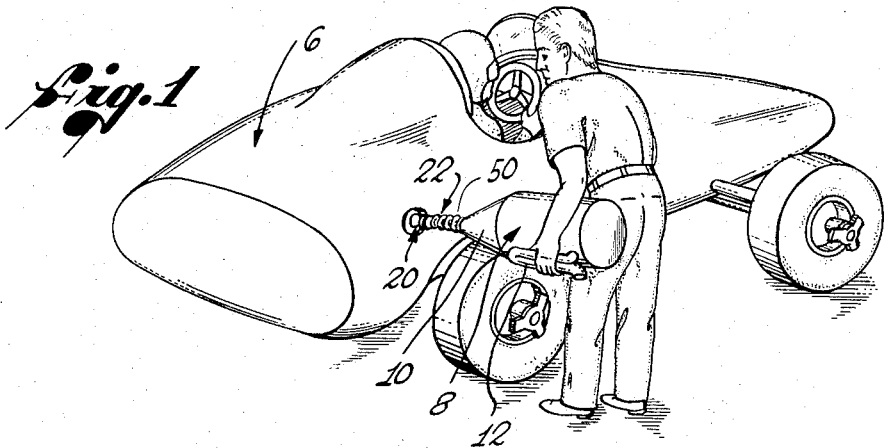
FIG. 1 is a perspective view showing the use of a releasable coupling according to the invention, for transferring fuel from a dump can to the tank of a racing automobile.

In operation, the probe 22 is forced into the open end of the passage 24 in the housing 20 (FIG. 1). To assist entry, the housing is provided with an upwardly and outwardly flared region 52 around the upper open end of the passage. As the probe is advanced into the passage, the nose member, which projects axially beyond the collar 44, comes into contact with the upper end of the plunger 30 and forces it away from the downstream surface of the valve seat 26 to open the passage 28 through the valve seat for flow of fuel. During this motion, the radially outer peripheral surface of the lower end of the collar 44 is moved into seating relation against the upstream side of the valve seat 26. During further downward pressure of the probe, the collar is arrested by the valve seat 26 and the nose member 36 continues to advance through the opening 28 so that the nose member upper surface, which constitutes a sleeve seat, unseats from adjacent inner peripheral surfaces of the collar 44 thereby enabling fuel to flow past the collar 44 through the opening 28 into the fuel tank.

Figure 4:
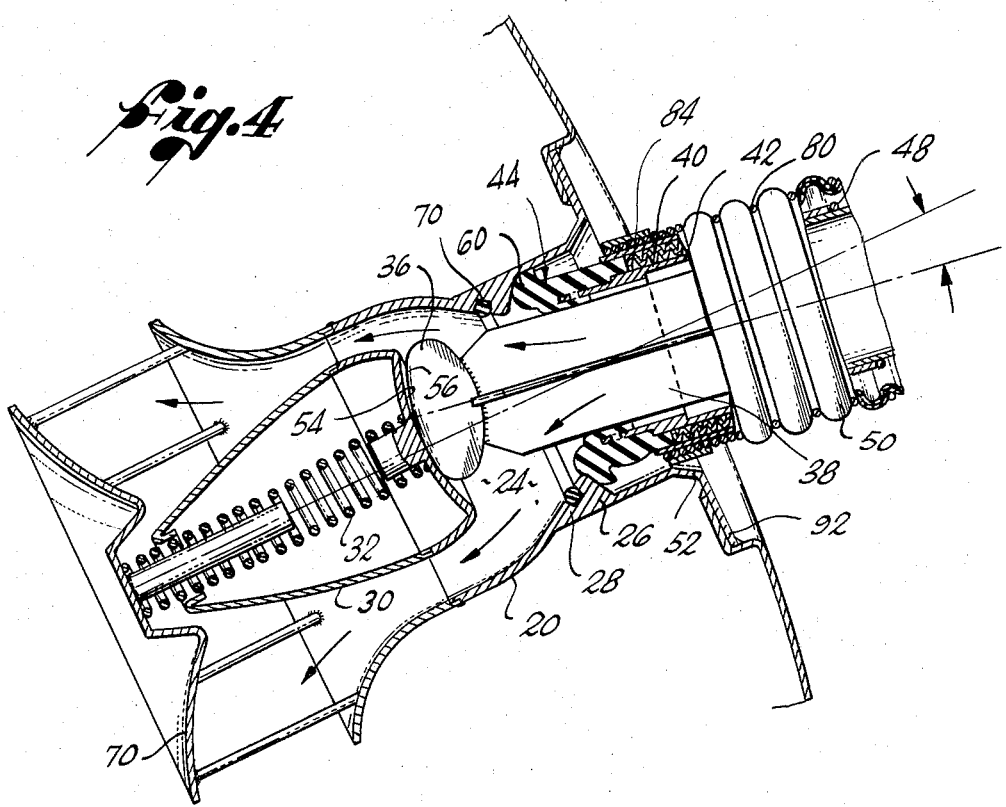
FIG. 4 is a fragmentary cross-sectional view on an enlarged scale of a second embodiment of the coupling with the coupling parts in a fully engaged position in which fuel is flowing from the supply into the tank.

The nose member 36 and the plunger 30 have a composite external surface shape, or profile, which is approximately of streamline configuration resembling an inverted tear drop. Because of this configuration the flow of liquid past the nose member and the plunger, in the open condition, remains laminar. By laminar it will be understood that the liquid flow follows streamline paths substantially without turbulence so that the flow of liquid into the tank proceeds as rapidly as possible. The tear drop shape, streamline configuration is substantially maintained even when the probe and the housing are angularly or transversely misaligned (FIG. 4). This result is achieved by providing the plunger 30 with a concavely dished, spherically curved upper end 54 which is matingly engaged by a convex, spherically curved, lower surface 56 on the nose member. The engaging spherical surfaces 54 and 56 have a tendency to turn about their point of contact when moved together, within a range of axial misalignment of approximately 10° in either direction. The plunger 30 being mounted on the spring 32 can position itself so as to accommodate this turning tendency. The composite external profile of the nose and the plunger does not change significantly within the range of misalignment which the coupling can accommodate. As a result the composite outline shape retains its approximately streamline configuration even despite appreciable misalignment, and flow past the composite outline can still remain substantially laminar.

It will also be understood that the foregoing arrangement whereby a path for fuel to flow to the tank is opened through the valve seat before the collar 44 is opened for flow, effectively eliminates the possibility of fuel flow before the tank is open to receive it thereby minimizing fuel spillage during coupling. In addition, the seating engagement between the collar 44 and the upper side of the seat 26 provides a fluid-tight seal while flow continues, preventing escape of fumes and fuel droplets into the atmosphere.

When the time comes to uncouple, the mechanic commences to withdraw the probe. In an initial stage of this movement, the spring 48 continues to hold the collar 44 in seated engagement against the valve seat 26 while the nose member moves back up into seating engagement with the collar 44 to shut off the flow of fuel. At the moment fuel flow ceases, the nose member 36 is still holding the plunger 30 open. As the raising motion continues, the sleeve and nose member are raised together out of the passage 24 so that the plunger 30 moves back into seating contact against the lower side of the valve seat 26, closing it.

As can be understood, the arrangement, whereby fuel supply is shut off during uncoupling before the path to the fuel tank is closed, avoids the possibility of continuing to supply fuel to a closed fuel tank thereby avoiding a serious cause of spillage in some prior devices. In addition, because the plunger remains open for a short period after closing of the fuel supply, there is an opportunity for the small amount of fuel remaining in the region of the opening 28 to drain into the fuel tank before the plunger closes. Even if the probe should be removed extremely rapidly so there is little time for the few drops remaining in the throat area to drain into the tank before the plunger closes, they are retained in a well defined by the portion of the passage extending between the valve seat 26 and the open end of the passage 24 so that they do not flow over the exterior of the automobile.

It will also be apparent that when the automobile is back on the track, the plunger 30 and valve seat 26 constitute an effective closure for the fuel tank which will continue to function even if the car should become inverted in an accident, thereby affording significant safety advantages in reducing the possibility of fire.

As just described, the portion of the passage 24 extending between the valve seat 26 and the upper open end of the passage constitutes a well which receives the free end of the probe including the sleeve valve 40. The cross-sectional dimensions of the well are made sufficiently large to enable it to receive the sleeve valve without binding engagement even when there is a substantial angular and/or transverse misalignment between the axes of the probe 22 and the housing 20. The well extends loosely around the bead 60 which does not seat until it reaches the upstream side of the seat 26. When the bead 60 reaches the valve seat 26, the collar and bead resiliently deform to provide a continuous peripheral seal against the upstream side of the valve seat 26. With that construction, the probe may be inserted at an angular misalignment from the axis of the housing of as much ten degrees in either direction without causing binding between the probe and the housing, thereby affording a significant advantage over certain prior refueling devices which required the male and female coupling elements to be in precise alignment to avoid binding.

In more detail, the collar 44 is formed from a substantially rigid, elastomeric material having high resistance to the degradative effects of gasoline. In the preferred embodiment, the material utilized is a vulcanized epichlorhydrin elastomer and the same material in an unvulcanized state may be used for the deformable cover 50. Other elastomers suitable for use in the invention include nitrile elastomers and fluorsilicone elastomers. The collar 44 comprises an annular body bonded to the lower tubular body 42 having a downwardly facing semicircular bead 60 (FIG. 4) around its lower edge. The radially outwardly facing peripheral surface of the bead 60 extends radially beyond the nose member 36 so that it can seat against the upper surface of the valve seat 26 which is generally conoidal. Because of the resiliently deformable properties of the collar, continuous peripheral seating contact between the bead 60 and adjacent portions of the housing can be maintained even despite the previously mentioned axial and/or lateral misalignment that may occur when the probe is inserted out of alignment. Such peripherally continuous contact could not readily be achieved utilizing two rigid mating conoidal surfaces with an interposed sealing ring, as known in the prior art.

The radially inner side of the bead 60 contacts the upper convex surface of the nose member 36 adjacent its radially outermost portion to provide a region of sealing engagement between them. In addition, an annular lip 68 extends inwardly from the collar 44 above the bead 60 and forms another region of sealing engagement between the nose member and the collar. The two peripherally extending regions of the nose member 36 at which it is engaged by the collar 44, together constitute the previously mentioned sleeve seat. The space between the open lower end of the upper tubular body 34 of the probe and the nose body constitutes an outlet opening for the probe which is closed to prevent liquid flow when the sleeve 40 is in its lower closed position with the collar 44 pressed against the sleeve seat.

To provide an effective seal between the plunger 30 and the valve seat 26 and to prevent damage to the plunger, a resilient, elastomeric sealing ring 70 (FIG. 2) is mounted in a circular groove in the underside of the valve seat 26 in a location to be sealingly contacted by the plunger. The diameter of the opening 28 through the valve seat 26 is sufficiently wide to allow the nose member 36 to pass through. In addition, the housing 20 is flared radially outwardly downstream beneath the valve seat and the upper portion of the plunger 30 is correspondingly configured. As a result, once the plunger starts to move downwardly, there is a very rapid rate of increase of the cross-sectional area of the opening between them so that flow through the opening is not constricted by the plunger. The configuration of the nose member 36 in relation to the downwardly divergent configuration of the housing downstream of the valve seat, also assists in avoiding constriction of the flow.

The bellows-like configuration of the cover 50 is maintained against internal fluid pressure which might otherwise cause ballooning, by a reinforcing spring 80 mounted about its exterior. At its upper and lower ends, the cover is bonded to the upper body and collar and metal clips are affixed around the exterior to secure the cover. To prevent collapsing the cover in its bottom region above the collar, a corrugated spacing ring 84 (FIG. 4) is interposed between the cover and the lower tubular member 42.

Figure 3:
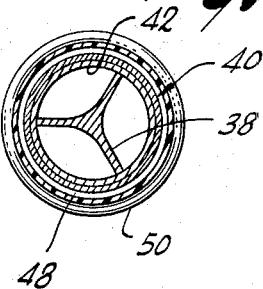
FIG. 3 is a cross-sectional view of a portion of the coupling shown in FIG. 2 taken along the lines 3—3 therein.

The strut 38 supporting the nose body resembles a three sided star in cross section (FIG. 3). The arms of the star resist the tendency of the fuel to swirl as it pours through the opening 28, which increases the rate of flow.

An elastomeric hose 90 (FIG. 2) connected about the lower end of the housing extends to the fuel tank. At the upper end of the housing, the housing is provided with a horizontal peripheral flange 92 by which it may be riveted to the automobile structure.

A second embodiment, shown in FIG. 4, differs only from the preferred embodiment just described, in that baffles 70 are provided downstream of the plunger to guide the incoming flow through a transverse change in directions without developing turbulence in the flow. Such an arrangement would be used where the housing is relatively short in relation to the combined length of the well and the plunger and the housing extends directly into the tank interior rather than being connected to it by an intervening conduit.

Figure 5:
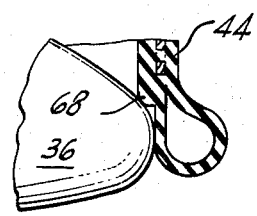
FIG. 5 is a fragmentary section of a third embodiment of the invention.

In another alternative embodiment (FIG. 5) the bead at the lower end of the collar is a hollow bead of generally pear shaped configuration having a lower, generally semicircular portion which functions in a similar manner to the previously described bead 60. Because of the hollow nature of the second embodiment of the bead it may be more suitable for application requiring a readily deformable bead where sealing flexibility is partially important.

In brief summary, a releasable coupling system according to the invention minimizes the opportunities for spillage of fuel during both coupling and uncoupling.

In particular the spherical mating surfaces on the head of the plunger and on the nose body of the probe enable those components to maintain a composite external shape of approximately streamline configuration even though the probe and the housing are misaligned. The use of a single piece deformable collar enables it to deform so that it can maintain continuous peripheral sealing contact with the housing during the use of a misaligned probe. Also, the coupling arrangement whereby the fuel tank is opened for flow before the probe starts to supply fuel, assures that fuel will not be spilled because of feeding before the tank is ready for it. Similarly, it is assured on uncoupling that the supply of fuel from the probe is shut off prior to the time at which access to the tank through the valve seat is closed. The wide configuration of the well and the curved surfaces on the valve seat and sleeve valve enable the probe to be inserted into the housing in a misaligned relationship and yet still deliver fuel to the tank without impaired operation or binding of the probe and housing together. As a further safety feature, the upwardly biased plunger bearing against the valve seat provides a closure for the fuel tank which will prevent fuel pouring from the tank if the car should ever become inverted in an accident.

Although the invention has been described with reference to a preferred embodiment, it will be understood by those skilled in the art that deletions, additions, substitutions and other changes may be made which fall within the spirit of the invention.

I claim:

1. A releasable coupling for connecting a fluid supply unit to a fluid receiving unit to minimize spillage of fluid during couping and uncoupling, comprising:
   a housing connected with one of the units;
   a passage in said housing communicating with the one unit and having an open end;
   a valve seat in said passage having upstream and downstream sides facing toward and away from the open end thereof, respectively;
   a plunger resiliently biased against the downstream side of said valve seat to close the same;
   a hollow probe connected with the other of the units extending in an axial direction, said probe including,
   a nose at one end of said probe;
   a sleeve valve including, a tubular, substantially rigid sleeve body surrounding said probe mounted thereon for sliding motion relatively towards and away from said nose;

an unsupported annular collar fixedly connected to said sleeve body extending concentrically therefrom towards said nose, said collar having, an internally facing, inner peripheral surface which seats in sealing relation against said nose in a closed condition;

an outwardly facing outer peripheral surface;

means connected to said sleeve body for resiliently biasing said inner surface of said collar into sealing contact with said nose to prevent flow outwardly from said probe;

said probe being insertable into said passage through the open end thereof to move said nose against said plunger thereby depressing the same from said valve seat to enable flow therethrough, insertion of said probe seating said outer surface of said collar against the upstream side of said valve seat, further inward movement of said probe causing separation between said nose and said collar to enable fluid to flow through said probe and said valve seat into the receiver, said collar being resiliently deformable to a sufficient extent to enable it to deform into peripherally continuous sealing engagement with said valve seat even when said probe is inserted into said passage in axially misaligned relation thereto.

2. A releasable coupling as defined in claim 1, wherein portions of said passage between the open end thereof and said valve seat constitute an upwardly facing well, said well being of sufficient width to permit entry of said sleeve into said well without binding engagement therebetween even when said sleeve and said well are in appreciable misalignment.

3. A releasable coupling as defined in claim 1 wherein said nose and said plunger, when in contact, have a composite external profile approximating a streamline shape whereby the flow of liquid past said shape remains substantially laminar, further including:

curved mating surfaces on said plunger and said nose enabling turning motion therebetween when said probe is inserted in axially misaligned relation into said passage while maintaining an approximately streamline composite external profile, said mating surfaces on said nose and said plunger having a tendency to turn about their point of contact when urged against each other in a condition of axial misalignment; and resilient means supporting said plunger for limited angular and transverse motion in said passage while urging said plunger towards said valve seat, said resilient means at least partially accommodating the turning tendency of said nose and said plunger whereby, when said probe is inserted in misaligned relation into said housing, said nose and said plunger turn relative to each other while maintaining their approximately streamline composite external profile.

4. A releasable coupling as defined in claim 1, wherein said collar at the lower end thereof includes a peripherally extending bead, said bead including:

a downwardly facing, generally semicircular portion; and a lip extending radially inwardly of said bead spaced above said semicircular portion; said lip and adjacent, radially inner regions of said semicircular portion of said bead seating against matingly configured regions of said nose, radially outer regions of said semicircular portion of said bead seating against matingly configured regions on the upstream side of said valve seat.

5. An assembly for filling a vehicle fuel tank with fuel to minimize spillage of fuel during coupling and uncoupling, the assembly comprising:

a housing connected with the fuel tank having, a passage communicating with the interior of the fuel tank and having one upwardly facing open end;

a valve seat within said passage, said valve seat having an opening therethrough to enable fuel flow along said passage;

a plunger movably positioned within said passage;

first biasing means for urging said plunger upwardly into seating relation against a lower side of said valve seat to prevent fuel flow through said opening;

a vertical dump can adapted to contain a supply of the fuel;

a spout at one vertical end of said dump can, said spout facing downwardly towards the vehicle fuel tank when said dump can is inverted to deliver fuel to the vehicle tank;

a hollow probe connected to said spout extending downwardly, said probe having, an outlet opening, a nose at one end of said probe;

a sleeve valve including, a tubular, substantially rigid sleeve body surrounding said probe mounted thereon for sliding motion relatively towards and away from said nose;

an unsupported annular collar fixedly connected to said sleeve body extending concentrically therefrom towards said nose, said collar having, an internally facing, inner peripheral surface which seats in sealing relation against said nose in a closed condition;

an outwardly facing outer peripheral surface; and means connected to said sleeve body for resiliently biasing said inner surface of said collar into sealing contact with said nose to prevent flow outwardly from said probe, said probe being insertable downwardly into said passage through the open end to bring said nose of said probe into contact with said plunger to unseat said plunger from said valve seat and to bring said outer surface of said collar into seating contact with an upper side of said valve seat facing towards the open of said passage, further downward movement of said probe into said passage causing separation between said probe and said collar thereby enabling fuel to flow from said dump can through said outlet opening in said probe and said opening in said valve seat into the fuel tank, said collar being resiliently deformable to a sufficient extent to enable it to deform into peripherally continuous sealing engagement with said valve seat even when said probe is inserted into said passage in axially misaligned relation thereto.

6. An assembly for filling a vehicle fuel tank with fuel to minimize spillage of the fuel, the assembly comprising:

a housing connected with the fuel tank having, a passage communicating with the interior of the fuel tank and having one upwardly facing open end;

a valve seat within said passage, said valve seat having an opening therethrough to enable fuel flow along said passage;

a plunger movably positioned within said passage;

first biasing means for urging said plunger upwardly into seating relation against a lower side of said valve seat to prevent fuel flow through said opening;

an overhead rig connected to an external supply of the fuel, said rig including, a hose communicating with the fuel supply movable to a position of alignment with said housing;

a hollow probe communicating with said hose extending in an axial direction, said probe having, an outlet opening;

a nose at one of said probe;

a sleeve valve including, a tubular, substantially rigid sleeve body surrounding said probe mounted thereon for sliding motion relatively towards and away from said nose;

an supported annular collar fixedly connected to said sleeve body extending concentrically therefrom towards said nose, said collar having, an internally facing, inner peripheral surface which seats in sealing relation against said nose in a closed condition;

an outwardly facing outer peripheral surface; and means connected to said sleeve body for resiliently biasing said inner surface of said collar into sealing contact with said nose to prevent flow outwardly from said probe, said probe being insertable downwardly into said passage through the open end to bring said nose of said probe into contact with said plunger to unseat said plunger from said valve seat and to bring said outer surface of said collar into seating contact with an upper side of said valve seat facing towards the open end of said passage, further downward movement of said probe into said passage, further downward movement of said probe into said passage causing separation between said probe and said collar thereby enabling fuel flow from said hose through said outlet opening in said probe and said opening in said valve seat into the fuel tank said collar being resiliently deformable to a sufficient extent to enable it to deform into peripherally continuous sealing engagement with said valve seat even when said probe is inserted into said passage in axially misaligned relation thereto.

* * * * *

UNITED STATES PATENT OFFICE
CERTIFICATE OF CORRECTION

PATENT NO. : 3,866,638
DATED : February 18, 1975
INVENTOR(S) : Ray E. Mingus and Ross M. Stuart It is certified that error appears in the above-identified patent and that said Letters Patent are hereby corrected as shown below:

IN THE ABSTRACT:

Line 16, please change "mmovement" to --movement--

Column 2, line 6, change "bring" to --brings-- line 8, change "race" to --face--

Column 6, line 47, after "much" insert --as--

Column 11, line 19, after "one" insert --end--.

Signed and Sealed this nineteenth Day of August 1975

[SEAL]

Attest:

RUTH C. MASON
Attesting Officer

C. MARSHALL DANN
Commissioner of Patents and Trademarks